Patented Dec. 10, 1929

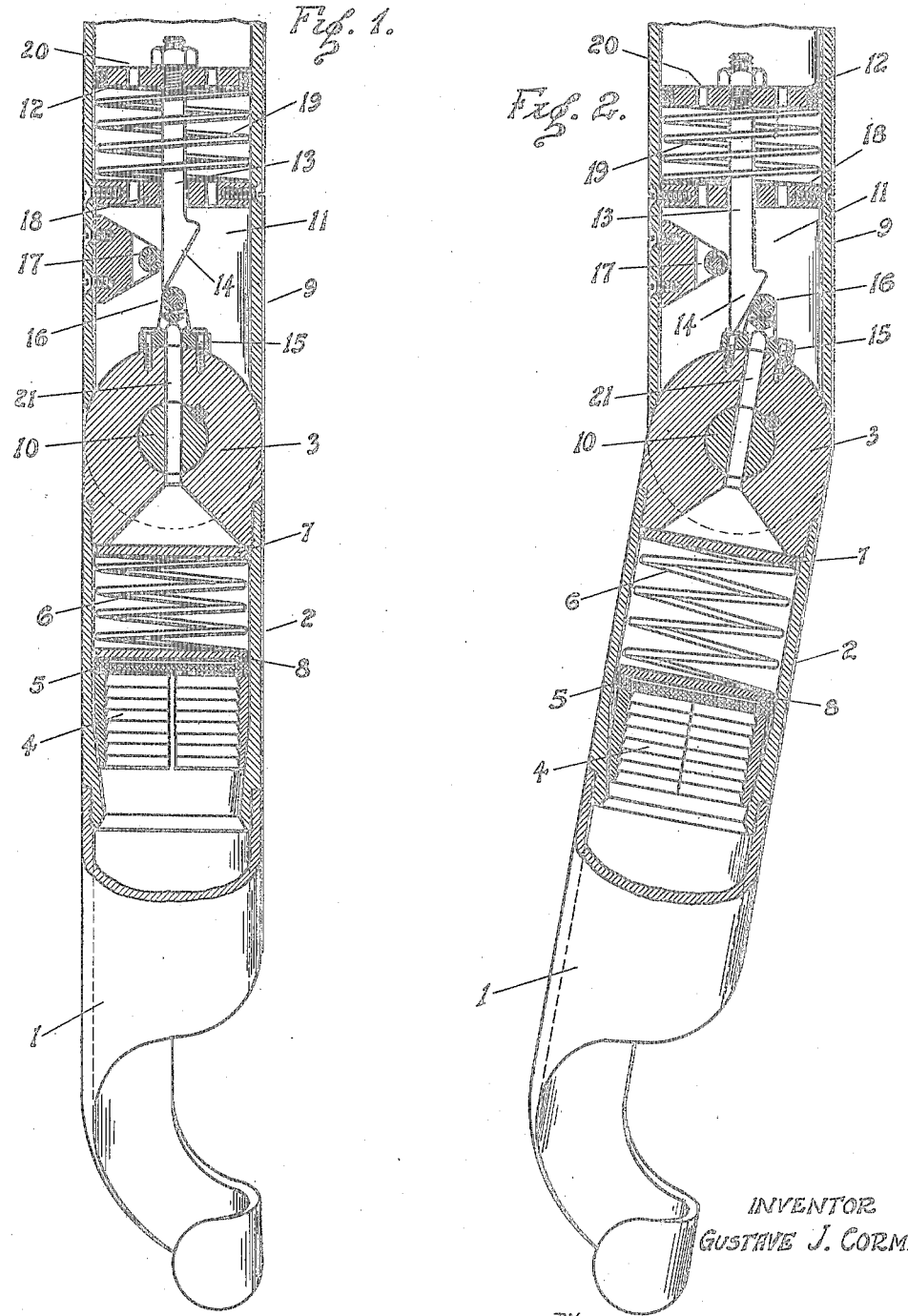

1,738,819

UNITED STATES PATENT OFFICE

GUSTAVE J. CORMIER, OF SEMINOLE, OKLAHOMA

OFFSET OVERSHOT TOOL

Application filed September 27, 1927. Serial No. 222,321.

In the drilling of wells it frequently occurs that tubing, rods, or the like, are broken and when so broken lean against the side of the casing where they are very difficult to engage with the ordinary fishing tool known as an overshot. That is, the fishing tool hangs in the center of the hole and thus cannot pass over the end of the rods or tubing which rest against the side of the casing.

An object of my invention is to provide a fishing tool which can be offset to engage the tubing, rods, or the like, and move them to the center where they can be grasped by the fishing tool.

Another object is to provide a fishing tool which is operated by the hydraulic pressure from the sludge pumps, or the drilling mud standing in the pipe.

Other objects, advantages, and features of invention may appear from the accompanying drawing, the subjoined detailed description, and the appended claims.

In the drawing:

Fig. 1, is a longitudinal sectional view of my fishing tool.

Fig. 2, is a longitudinal sectional view of the same in offset position.

Referring more particularly to the drawing:

My fishing tool comprising a hook 1 which is screwed onto a slip casing 2 and a hinged joint 3 is threaded into the top of the slip casing 2. The usual slips 4 are positioned in the casing 2 and are urged downwardly into engaging position by a cup 5 resting on the top thereof, and a spring positioned between plates 7, 8 and by the additional urge of the sludge pump pressure on the drilling mud, as will be further described.

A tube 9 rises above the joint 3 and is hinged to said joint by the pin 10, or any other suitable joint connection, and within the tube 9 I provide the offset mechanism 11 which comprises a piston 12 to which is secured a post 13 formed with a wedge 14 on the bottom thereof. To the joint 3 is secured a fitting 15 to which a roller 16 is secured. A second roller 17 is secured to the tubular section 9 and the wedge 14 operates between the rollers 16, 17. A guide 18 is provided for the post 13 and a spring 19 is positioned between the guide 18 and piston 12.

The drilling of an oil well by the rotary process requires that a constant flow of mud and water shall be forced down through the drill pipe and upwardly in the casing to the surface. This mud and water is called drilling mud and serves to lubricate the bit, remove the particles cut by the bit, and also serves to sustain the walls of the hole before the casing is set in position. This drilling mud is necessarily forced into the hole under a very high pressure since it must be circulated to the bottom of the hole and again to the surface in order to accomplish the process above stated.

In operation the sludge pump pressure forces the piston 12 downwardly against the tension of the spring 19, thus moving the post 13 downwardly and carrying the wedge 14 between the rollers 16, 17 and thus moving the roller 16, joint 3, and the entire lower section of the tool to one side, as shown in Figure 2. Small bleed holes 20 are provided in the piston 12 and the mud passes through the holes, and thence through the duct 21 through the joint 3, which last named duct opens to the space above the cup 5. The drilling mud pressure forces the cup 5 and slips 4 downwardly grasping the pipe or the rods which have been moved upwardly between the slips by the action of the hook 1, as will be evident to those skilled in the art.

Having described my invention, I claim:

1. An offset overshot tool comprising a wall hook, a slip casing rising from the hook, slips in the casing, a hinged joint on the upper end of the slip casing, a tubular section hinged to said joint, a piston in said tube operable by the drilling mud pressure, a rod depending from said piston, a wedge on the bottom of said rod, said wedge being adapted to engage the joint to swing the same to one side and extend the hook and slip casing at an angle to the tubing.

2. An offset overshot tool comprising a wall hook, a slip casing rising from the hook, slips in the casing, a hinged joint on the upper end of the slip casing, a tubular section hinged to said joint, a piston in said tube operable by the drilling mud pressure, a rod depending from the piston, a guide through which the rod extends, a spring between the piston and guide, a roller secured to said hinged joint, a second roller secured to the tubing, a wedge on the bottom of said rod adapted to extend between said rollers whereby the joint is rotated to swing the hook and casing at an angle to the tubular section.

3. An offset overshot tool comprising a wall hook, a slip casing rising from the hook, slips in the casing, a hinged joint on the upper end of the slip casing, a tubular section hinged to said joint, a piston in said tube operable by the drilling mud pressure, a rod depending from said piston, a wedge on the bottom of said rod, said wedge being adapted to engage the joint to swing the same to one side and extend the hook and slip casing at an angle to the tubing, said joint having a duct extending therethrough, and said piston having bleed holes therein through which the drilling mud is adapted to pass to operate said slips.

4. An offset overshot tool comprising an upper tubular section, a slip section hingedly connected to the tubular section, slips in the slip section, a hydraulically actuated piston in the tubular section, means depending from said piston and engaging the upper end of the slip section, whereby said slip section is extended at an angle to the tubular section when the piston is depressed, a cup resting on said slips, said piston having bleed holes therein through which the hydraulic pressure passes to bear against the cup and compress the slips.

5. An offset overshot tool comprising a wall hook, a slip casing rising from the hook, slips in the casing, a hinged joint on the upper end of the slip casing, a tubular section hinged to said joint, a piston in said tubular section operable by the drilling mud pressure, a rod depending from said piston, a wedge on the bottom of said rod, said wedge being adapted to engage the joint to swing the same to one side and extend the hook and slip casing at an angle to the tubing, a guide in the tubular section through which the rod extends, and a spring between said guide and piston.

In testimony whereof, I affix my signature.

GUSTAVE J. CORMIER.